United States Patent
Matsuda

(10) Patent No.: US 7,407,027 B2
(45) Date of Patent: Aug. 5, 2008

(54) DRIVING FORCE CONTROL APPARATUS AND METHOD FOR AUTOMOTIVE VEHICLE

(75) Inventor: Toshiro Matsuda, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 398 days.

(21) Appl. No.: 11/144,609

(22) Filed: Jun. 6, 2005

(65) Prior Publication Data
US 2005/0279545 A1 Dec. 22, 2005

(30) Foreign Application Priority Data
Jun. 7, 2004 (JP) ............................. 2004-167914

(51) Int. Cl.
*B60W 20/00* (2006.01)
(52) U.S. Cl. ...................... 180/65.2; 180/65.3; 903/943
(58) Field of Classification Search ................ 180/65.2, 180/65.3, 65.4, 65.8; 701/22; 903/943; 320/132, 320/149
See application file for complete search history.

(56) References Cited

U.S. PATENT DOCUMENTS

| | | | |
|---|---|---|---|
| 5,343,970 A * | 9/1994 | Severinsky | 180/65.2 |
| 5,495,906 A | 3/1996 | Furutani | |
| 5,786,138 A | 7/1998 | Swenson | |
| 6,116,363 A | 9/2000 | Frank | |
| 6,344,732 B2 * | 2/2002 | Suzuki | 320/132 |
| 6,563,230 B2 * | 5/2003 | Nada | 290/40 C |
| 6,659,213 B2 * | 12/2003 | Kubo et al. | 180/65.4 |
| 6,784,563 B2 * | 8/2004 | Nada | 290/40 C |
| 6,986,398 B2 * | 1/2006 | Obayashi | 180/65.2 |
| 7,019,489 B2 * | 3/2006 | Nakada | 320/104 |
| 7,073,615 B2 * | 7/2006 | Mack | 180/65.2 |
| 7,173,396 B2 * | 2/2007 | Gunji | 320/132 |

FOREIGN PATENT DOCUMENTS

| | | |
|---|---|---|
| EP | 1 205 331 A2 | 5/2002 |
| EP | 1 375 241 A1 | 1/2004 |
| GB | 2 392 892 A | 3/2004 |
| JP | 2000-318473 A | 11/2000 |

OTHER PUBLICATIONS

U.S. Appl. No. 11/145,175, filed Jun. 6, 2005, Matsuda.
U.S. Appl. No. 11/155,777, filed Jun. 20, 2005, Tokunou.
U.S. Appl. No. 11/145,186, filed Jun. 6, 2005, Masuda et al.

* cited by examiner

*Primary Examiner*—Jeffrey J Restifo
(74) *Attorney, Agent, or Firm*—Foley & Lardner LLP

(57) ABSTRACT

In driving force control apparatus and method for an automotive vehicle, an internal combustion engine drives mainly driven wheels of the vehicle, a generator is driven by the internal combustion engine, a motor is driven by a power of the generator, the motor is capable of driving other wheels than the mainly driven wheels, a condenser electrically connected to the generator in parallel with the motor, and a condenser controlling section (8G) connects the condenser to the motor in a case where a vehicle speed (Vv) is equal to or lower than a predetermined vehicle speed and disconnects the condenser from the motor and the generator in a case where the vehicle speed is in excess of the predetermined vehicle speed.

17 Claims, 8 Drawing Sheets

DRIVING FORCE CONTROL APPARATUS AND METHOD FOR AUTOMOTIVE VEHICLE

BACKGROUND OF THE INVENTION

1. Field of the Invention

The present invention relates to driving force control apparatus and method for an automotive vehicle which are capable of driving auxiliary driven wheels by means of powers of a generator and a condenser such as a battery or a capacitor. The generator is driven by means of an internal combustion engine of the vehicle. The internal combustion engine drives mainly driven wheels of the vehicle.

2. Description of the Related Art

A Japanese Patent Application First Publication No. 2000-318473 (published on Nov. 21, 2000) exemplifies a previously proposed vehicular driving force control apparatus. In this driving force control apparatus, mainly driven wheels are driven by means of an internal combustion engine and auxiliary driven wheels are driven by means of a motor so that the vehicle is in a four-wheel drive state. At this time, a dynamic power of the internal combustion engine drives the generator and the motor is driven by means of the power of the generator.

SUMMARY OF THE INVENTION

In a case where the previously proposed driving force control apparatus is applied to a vehicle having a large mass (heavy weight) and to a vehicle in which a start performance is furthermore improved, it is necessary to enlarge a generation torque of the motor. To achieve this, an enlargement of the generation torque, a generator power is needed to be enlarged. For example, the generator is needed to be large sized. In addition, a battery is additionally mounted to increase the generation torque of the motor without enlarging the generator capacity and a required electric current is secured. However, in the case of a simple addition of the battery to the previously proposed driving force control apparatus, it is possible to supply a required large current from the battery to the motor in a case of a low speed region in which both of the generator voltage and motor voltage are low. However, in a case of a high speed region in which the generator voltage and motor voltage are high, when the voltages of these generator and motor are higher than the battery voltage, part of output current of the generator is caused to flow into the battery. Hence, the required generator voltage and motor voltage are not secured so that there is a possibility that the driving force required for the four-wheel drive vehicle cannot sufficiently be secured.

It is, therefore, an object of the present invention to provide driving force control apparatus and method for an automotive vehicle which are capable of increasing efficiently a generation driving force of a motor.

According to one aspect of the present invention, there is provided a driving force control apparatus for an automotive vehicle, comprising: an internal combustion engine that drives mainly driven wheels of the vehicle; a generator that is driven by the internal combustion engine; a motor that is driven by a power of the generator and is capable of driving other wheels than the mainly driven wheels; a condenser electrically connected to the generator in parallel with the motor; and a condenser controlling section that connects the condenser to the motor in a case where a vehicle speed (Vv) is equal to or lower than a predetermined vehicle speed and disconnects the condenser from the motor and the generator in a case where the vehicle speed is in excess of the predetermined vehicle speed.

According to another aspect of the present invention, there is provided a driving force control method for an automotive vehicle, comprising: providing an internal combustion engine that drives mainly driven wheels of the vehicle; providing a generator that is driven by the internal combustion engine; providing a motor that is driven by a power of the generator and is capable of driving other wheels than the mainly driven wheels; providing a condenser electrically connected to the generator in parallel with the motor; connecting the condenser to the motor in a case where a vehicle speed (Vv) is equal to or lower than a predetermined vehicle speed; and disconnecting the condenser from the motor and the generator in a case where the vehicle speed is in excess of the predetermined vehicle speed.

According to the present invention, it becomes possible to secure a driving force required as a four-wheel drive vehicle. This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1:
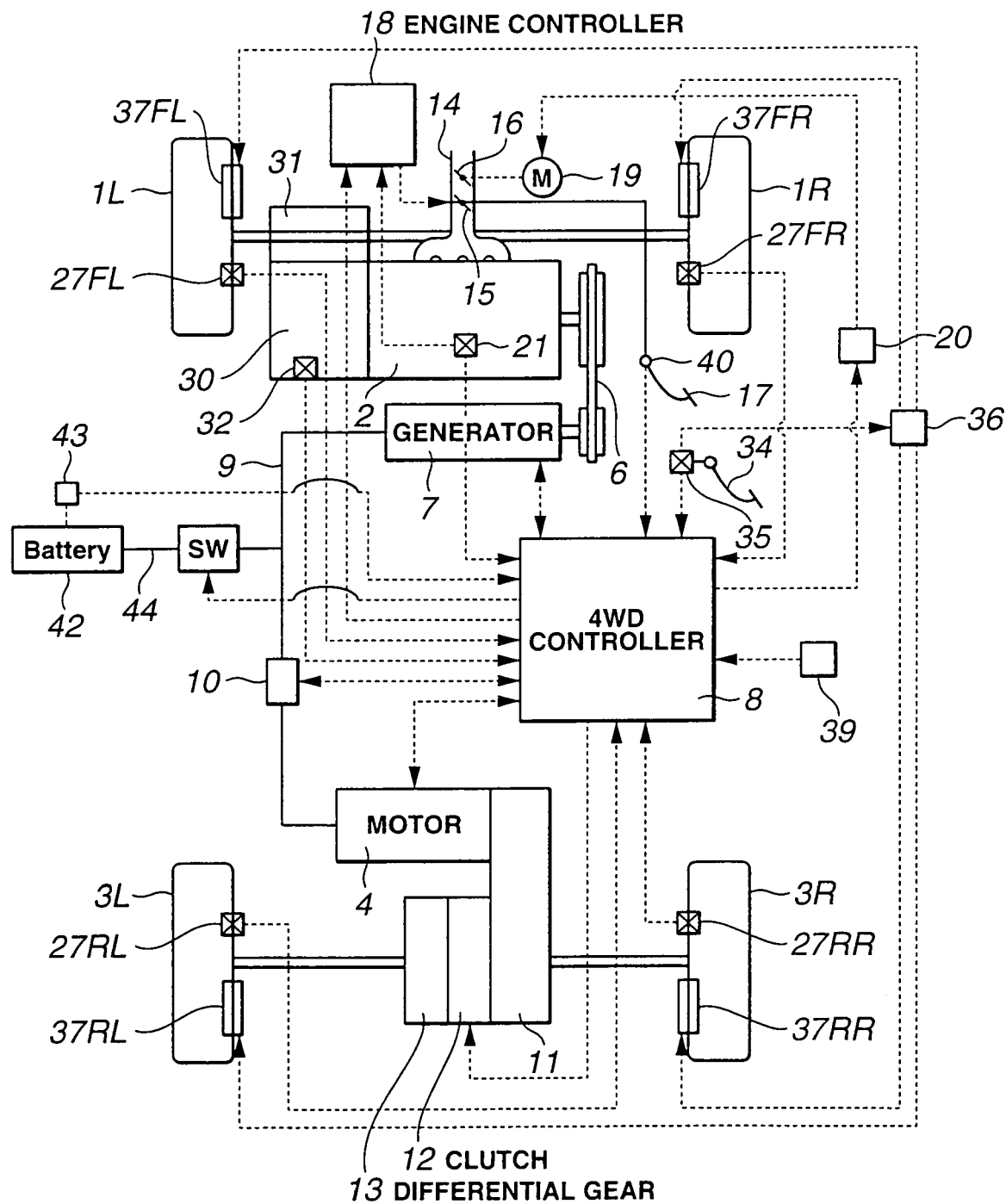
FIG. 1 is a rough system configuration view of an automotive vehicle to which a driving force control apparatus in a preferred embodiment according to the present invention is applicable.

FIG. 1 shows a system configuration view of a vehicular driving force control apparatus in a preferred embodiment according to the present invention. As shown in FIG. 1, an automotive vehicle, in this embodiment, has mainly driven wheels of front left and right wheels 1L, 1R which are driven by means of an engine 2 and has auxiliary driven wheels of rear left and right road wheels 3L, 3R which can be driven by means of a motor 4. An output torque Te of engine 2 is transmitted to front left and right road wheels 1L, 1R via an automatic transmission 30 and a first differential gear 31.

A shift position detecting section 32 to detect a present gear-shift range is installed within automatic transmission 30 and outputs a detected shift position signal to a 4WD controller 8. A gear shift operation is carried out by automatic transmission 30 on the basis of a shift command from a gear shift control portion (not shown). The gear shift control portion is provided with an information such as a gear shift schedule based on vehicle speed Vv and accelerator opening angle θ in a form of a map and outputs a shift command to automatic transmission 30 when determining that a gear shift point is passed on the basis of the present vehicle speed Vv and accelerator opening angle θ.

A main throttle valve 15 and a sub throttle valve 16 are intervened in an intake air passage 14 of engine 2 (for example, an intake manifold). In main throttle valve 15, a throttle opening angle is angularly controlled according to a depression quantity of accelerator pedal 17 which is an accelerator opening angle indicating device (an acceleration indication operating section). This main throttle valve 15 is mechanically interlinked to the depression quantity of accelerator pedal 17 and its throttle valve is adjusted by an electrical adjustable control of an engine controller 18 in accordance with a depression quantity detection value of an accelerator sensor 40. The detected value of the depression quantity of accelerator sensor 40 is also outputted to 4WD controller 8.

In addition, an opening angle of a sub-throttle valve 16 is adjustably controlled with a stepping motor 19 as an actuator and according to a revolution angle which accords with a stepped number of stepping motor 19. The revolution angle of stepping motor 19 is adjustably controlled according to the drive signal from motor controller 20. It is noted that a throttle sensor is installed on sub-throttle valve 16 and, on the basis of the detected value of throttle opening angle detected by this throttle sensor, the step number of stepping motor 19 is feedback controlled. It is noted that, when the throttle opening angle of sub-throttle valve 16 is adjusted through an opening angle or below the opening angle of main throttle valve 15, an output torque of engine 2 can be controlled independently of an operation of the driver through an accelerator pedal.

In addition, an engine speed sensor 21 to detect an engine speed of engine 2 is provided and outputs the detected signal to engine controller 18 and 4WD controller 8. In addition, a reference sign 34 denotes a brake pedal and a stroke quantity of brake pedal 34 is detected by means of a brake stroke sensor 35. Brake stroke sensor 35 outputs the detected brake stroke quantity to a brake controller 36 and 4WD controller 8.

Brake controller 36 controls a braking force acted upon the vehicle in accordance with the inputted brake stroke quantity through brake units 37FL, 37FR, 37RL, 37RR such as disc brakes equipped in respective road wheels 1L, 1R, 3L, and 3R. A reference sign 39 denotes a drive mode switch and serves to output a switch command between 2WD (two-wheel drive) and 4WD (four-wheel drive) states. A part of revolution torque Te of engine 2 is transmitted to a generator 7 via an endless belt 6 and generator 7 is revolved at a revolution speed Nh which is a multiplication of engine speed Ne of engine 2 with a pulley ratio.

Figure 2:
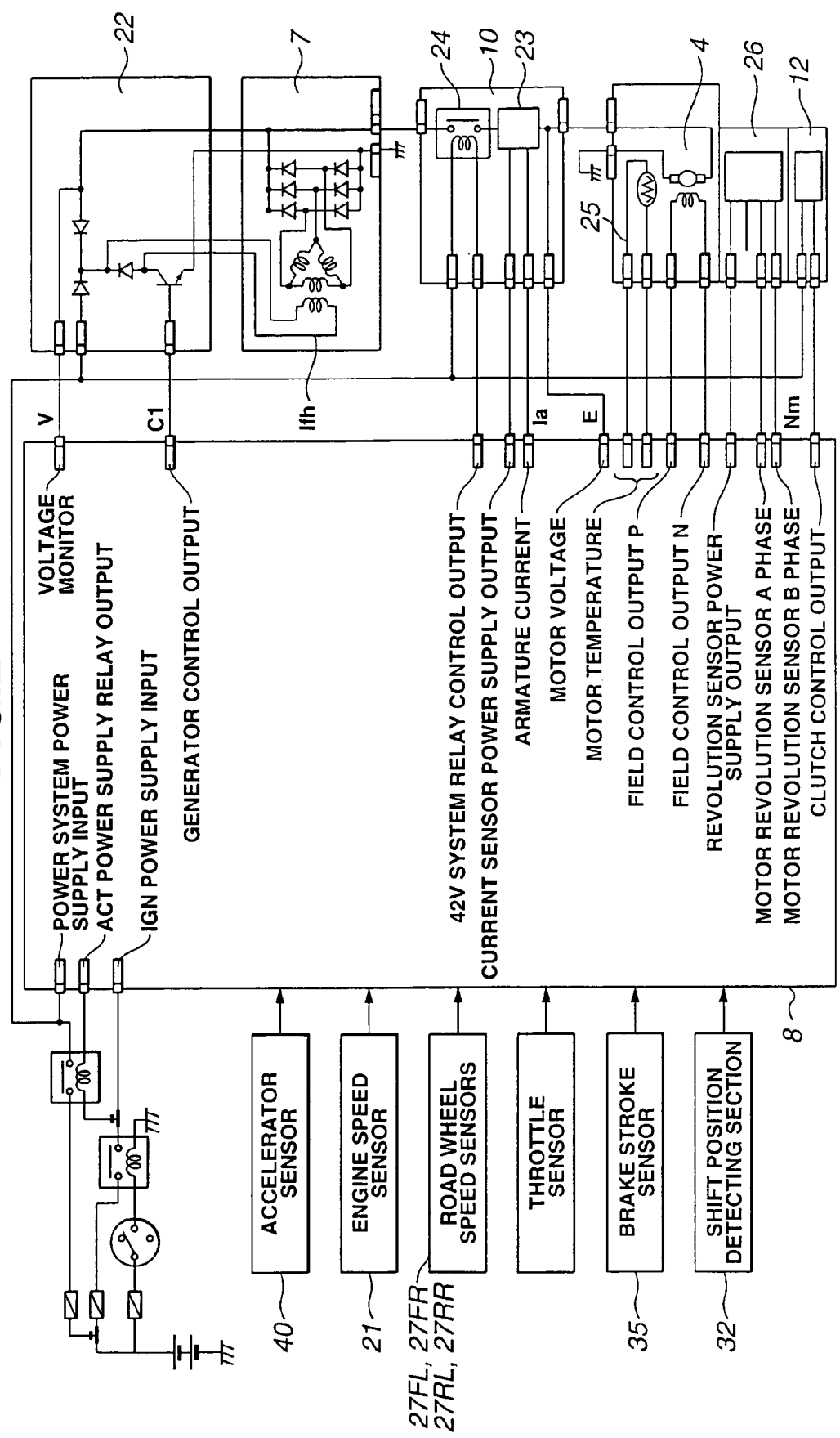
FIG. 2 is a system configuration view around a 4WD controller shown in FIG. 1.
Figure 3:
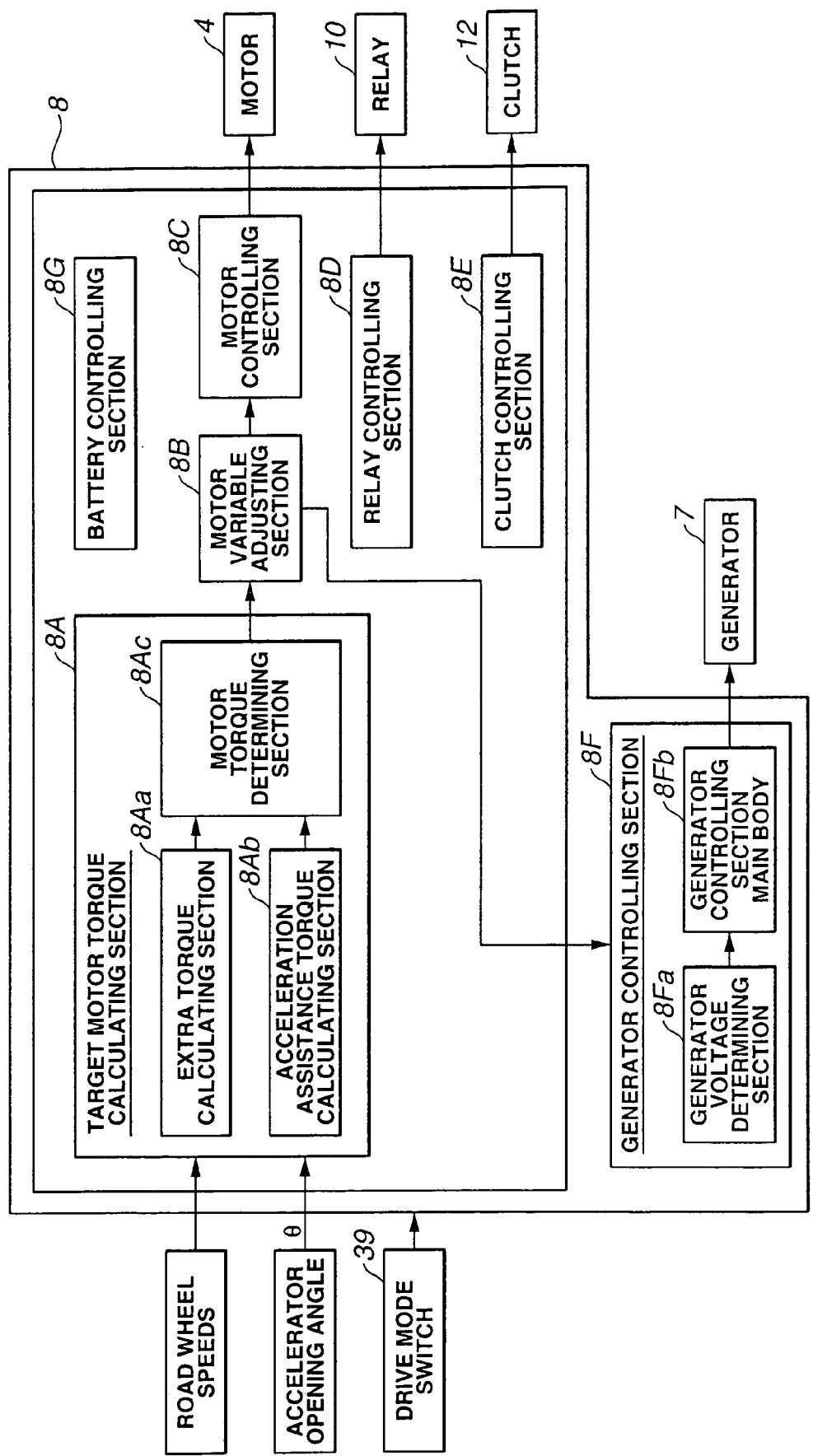
FIG. 3 is a functional block diagram representing a 4WD controller shown in FIGS. 1 and 2.

Generator 7 is, as shown in FIG. 2, equipped with a voltage adjuster 22 (or voltage regulator) to adjust an output voltage Vg of generator 7 and to control a generator load for engine 2 and generator voltage Vg for engine 2 by adjusting a field current Ifh in accordance with a generator control command C1 (a duty ratio) from a generator controlling section 8F of 4WD controller 8 (refer to FIG. 3). That is to say, voltage regulator 22 inputs generator control command C1 (duty ratio) from generator controlling section 8F, adjusts field current Ifh of generator 7 to the duty ratio in accordance with generator control command C1, detects output voltage Vg of generator 7, and can output the detected voltage Vg to 4WD controller 8.

It is noted that revolution speed Nh of generator 7 is calculated on the basis of the pulley ratio from revolution speed Ne of engine 2. The electric power generated by generator 7 is enabled to be supplied to motor 4 via electric wire 9. A junction box 10 is installed in a midway through electric wire 9. A drive axle of motor 4 is connectable to rear road wheels 3L, 3R via a speed reducer 11 and a clutch 12. A reference sign 13 denotes a second differential gear.

A current sensor 23 is installed within junction box 10. Current sensor 23 serves to detect a current value Ia of a power supplied from generator 7 to motor 4 and to output a detected armature current signal to 4WD controller 8. A reference sign 24 denotes a relay. Interruption (disconnection) and connection of voltage (current) supplied to motor 4 are controlled through relay 24 according to a command issued from 4WD controller 8.

In addition, motor 4 has field current Ifm controlled according to a command issued from 4WD controller 8. The adjustment of its field current Ifm of motor 4 causes a drive torque of motor 4 to be adjusted to a target motor torque Tm. It is noted that a reference sign 25 denotes a thermistor to measure a temperature of motor 4. Motor 4 is provided with a motor revolution speed sensor 26 to detect a revolution speed Nm of a drive axle of motor 4. This motor revolution speed sensor 26 outputs the detected revolution speed signal of motor 4 to 4WD controller 8.

Electric wire 9 is branched into a second electric wire 44 at an upstream position of junction box 10 and this second electric wire 44 is connected to a battery 42 constituting the condenser via a switch SW. The connection and interruption (disconnection) of this switch SW are controlled in accordance with a command from 4WD controller 8. It is noted that battery 42 may serve as a battery which serves to supply the electric power to generally available electrical and electronic parts (not shown) or may be a battery exclusively used for the drive. It is noted that a remaining capacity detecting section 43 to detect a remaining capacity of battery 42 is provided and the remaining capacity detecting section 43 outputs the detected signal indicating the remaining capacity of battery 42 to 4WD controller 8.

Each road wheel 1L, 1R, 3L, 3R is provided with a road wheel speed sensor 27FL, 27FR, 27RL, 27RR. Each road wheel speed sensor 27FL, 27FR, 27RL, 27RR outputs a pulse signal in accordance with the revolution speed of the corresponding road wheel 1L, 1R, and 3L, 3R to 4WD controller 8 as a road wheel speed detection value.

4WD controller 8, as shown in FIG. 3, includes a target motor torque calculating section 8A, a motor variable adjusting section 8B, a motor controlling section 8C, a relay controlling section 8D, a clutch controlling section 8E, generator controlling section 8F, and a battery controlling section 8G. A drive mode switch 39 is activated in a case of the 4WD state.

Relay controlling section 8D controls an interruption (disconnection) and connection of the electric power supply from generator 7 to motor 4. During the four wheel drive state, namely, in a case where a target motor torque Tm is larger than zero, relay 24 is in the connection state. In a case where target motor torque Tm is zero, relay 24 is in the interruption state. Clutch controlling section 8E controls the state of clutch 12. In the case of the four-wheel drive state, namely, in a case where target motor torque Tm is larger than zero, clutch 12 is in the connection state. In a case where target motor torque Tm is zero, target motor torque Tm is in an open state.

Figure 4:
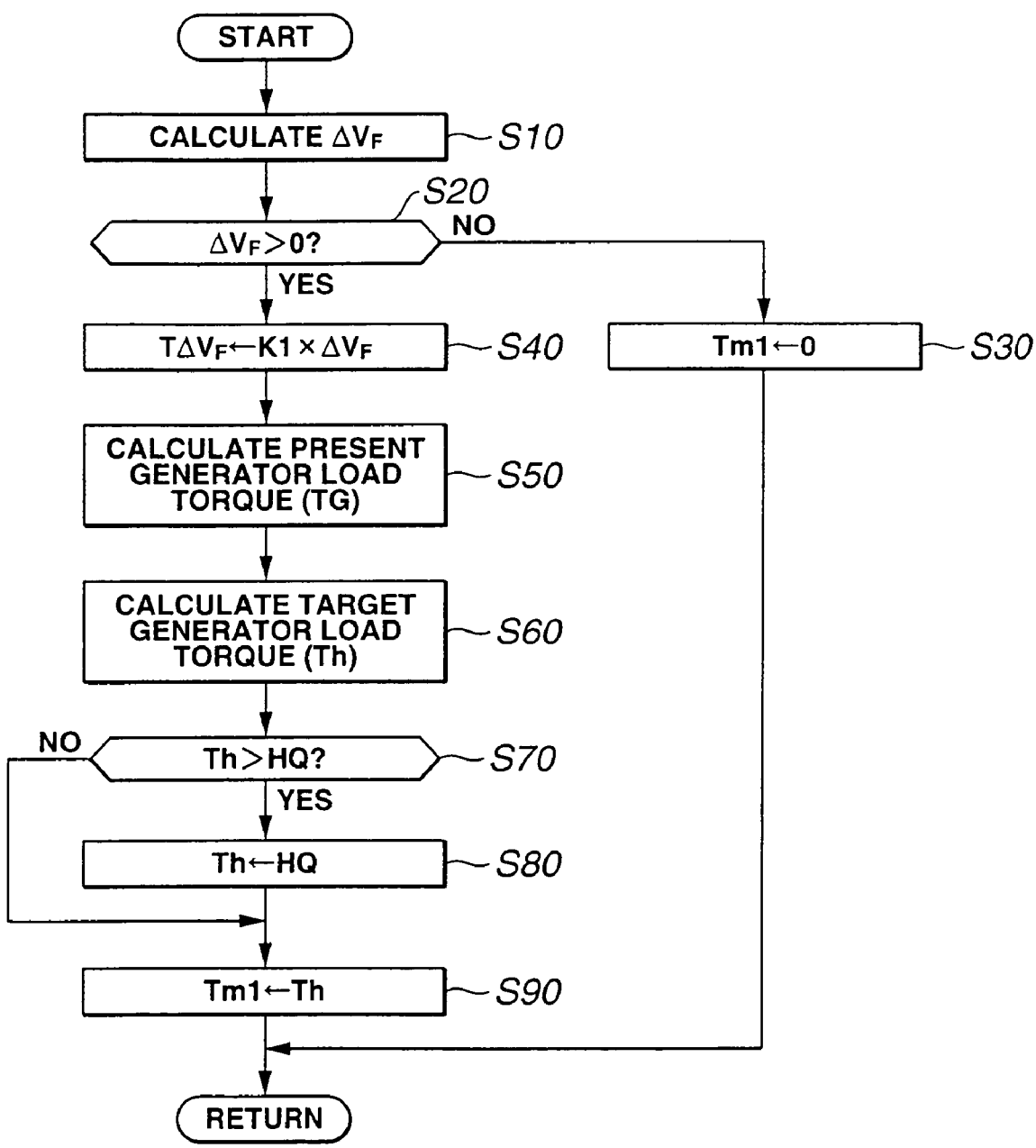
FIG. 4 is a flowchart representing a processing of an extra torque calculating section of the 4WD controller.

Motor torque calculating section 8A includes an extra torque calculating section 8Aa, an acceleration assistance torque calculating section 8Ab, and a motor torque determining section 8Ac. Extra torque calculating section 8Aa is a section that calculates an extra engine torque in accordance with an acceleration slip of front road wheels 1L, 1R and executes the following processing on the basis of each signal inputted for each of predetermined sampling periods as shown in FIG. 4. That is to say, at a step S10, extra torque calculating section 8Aa subtracts the road wheel speeds of rear road wheels 3L, 3R (auxiliary driven wheels) from the road wheel speeds of front road wheels 1L, 1R (mainly driven wheels), these road wheel speeds being calculated on the basis of the signals from road wheel speed sensors 27FL, 27FR, 27RL, 27RR to derive a slip speed $\Delta V_F$ which is an acceleration slip quantity of front road wheels 1L, 1R and the routine goes to a step S20.

The calculations of slip speed $\Delta V_F$ is, for example, carried out as follows: An average front road wheel speed VWf and an average rear road wheel speed VWr are respectively calculated. Next, the slip speed (acceleration slip quantity) $\Delta V_F$ indicating a degree of acceleration slip of front road wheels 1L, 1R which are mainly driven wheels is calculated from a deviation between average front road wheel speed VWf and average rear road wheel speed VWr according to the following equation.

$$\Delta V_F = VWf - VWr$$

At step S20, extra torque calculating section 8Aa determines whether slip speed $\Delta V_F$ is larger than a predetermined value, for example, zero. If slip speed $\Delta V_F$ is equal to or smaller than zero, front road wheels 1L, 1R are determined not in the acceleration slip state and the routine goes to a step S30. At step S30, zero is substituted into Tm1 and the routine is returned to a start position. On the other hand, $\Delta V_F > 0$ (Yes) at step S20, the routine goes to a step S40 since the acceleration slip occurs on front road wheels 1L, 1R.

At step S40, extra torque calculating section 8Aa calculates an absorption torque $T\Delta V_F$ required to suppress the acceleration slip of front road wheels 1L, 1R. Then, the routine goes to a step S50. This absorption torque $T\Delta V_F$ is proportional to an acceleration slip quantity.

$$T\Delta V_F = K1 \times \Delta V_F$$

, wherein K1 denotes a gain determined according to experiments.

At step S50, a load torque TG of present generator 7 is calculated on the basis of the following equation and the routine goes to a step S60.

$$TG = K2 \times (Vg \times Ia)/(K3 \times Nh),$$

wherein Vg denotes the voltage across generator 7, Ia denotes an armature current of generator 7, Nh denotes the revolution speed of generator 7, K3 denotes an efficiency, and K2 denotes a coefficient.

At a step S60, extra torque calculating section 8Aa derives a generator load torque Th to be loaded on generator 7 (an extra torque) and the routine goes to a step S70.

$$Th = TG + T\Delta V_F$$

At step S70, extra torque calculating section 8Aa determines whether generator load torque Th is larger than a maximum load capacity HQ of generator 7 determined according to specifications. If generator load torque Th is equal to or smaller than maximum load torque HQ, the routine goes to a step S90. If target generator load torque Th is in excess of maximum load capacity HQ (Yes) at step S70, the routine goes to a step S80 at which generator load torque Th is limited to maximum load capacity HQ and the routine goes to step S90.

At step S90, extra torque calculating section 8Aa derives a first target motor torque Tm1 in accordance with generator load torque Th and the routine is ended. This first target motor torque Tm1 provides a target motor torque in accordance with the front road wheel acceleration slip quantity. In the above processing, once the load torque at generator 7 is derived, first target motor torque Tm1 is calculated. However, first target motor torque Tm1 may be derived directly from the front road wheel acceleration slip quantity.

Figure 5A:
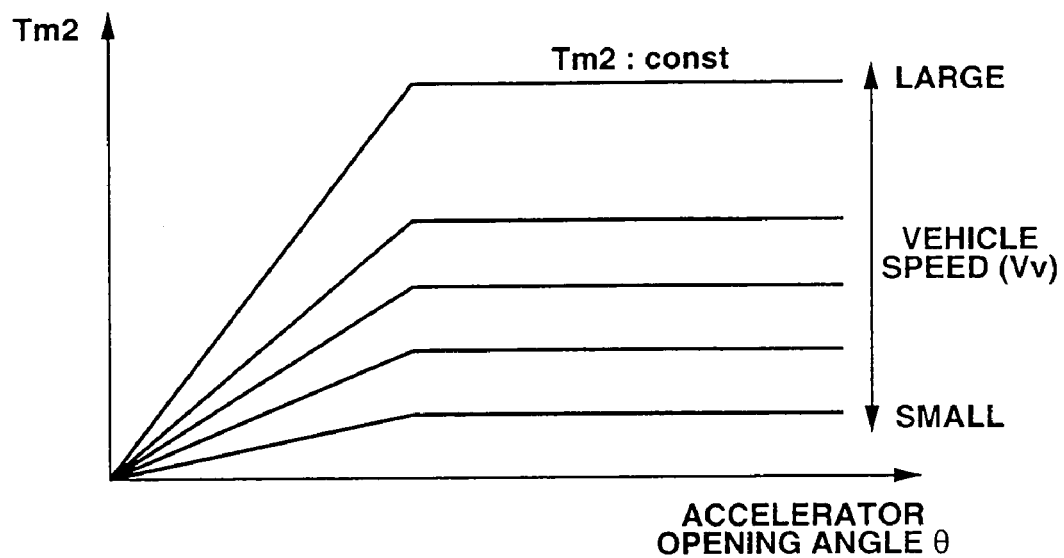
FIGS. 5A and 5B are characteristic graphs representing relationships from among an accelerator opening angle, a vehicle speed, and second target motor torques.
Figure 5B:
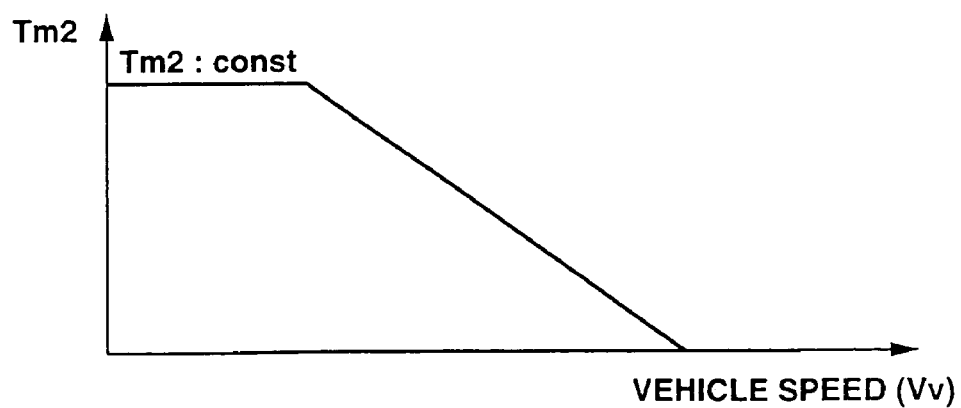

Next, the processing at acceleration assistance torque calculating section 8Ab will be described below. An acceleration assistance torque calculating section 8Ab calculates a second target motor torque Tm2 which accords with vehicle speed Vv and accelerator opening angle θ (acceleration indicative quantity by a vehicle driver) on the basis of a map shown in FIGS. 5A and 5B. This second target motor torque Tm2 becomes larger as the accelerator opening angle θ becomes larger (wider), becomes smaller as vehicle speed Vv becomes smaller (slower), and is set to zero when the vehicle speed Vv becomes equal to or higher than a predetermined vehicle speed. The predetermined vehicle speed is, for example, a predetermined low vehicle speed VvvL at which the vehicle is estimated to get out of a start state. Next, motor torque determining section 8Ac performs a select high between first and second target torque Tml, Tm2 calculated by extra torque calculating section 8Aa and acceleration assistance torque calculating section 8Ab, determines a larger one as a target motor torque Tm, and outputs target motor torque Tm to motor variable adjusting section 8B.

Figure 6:
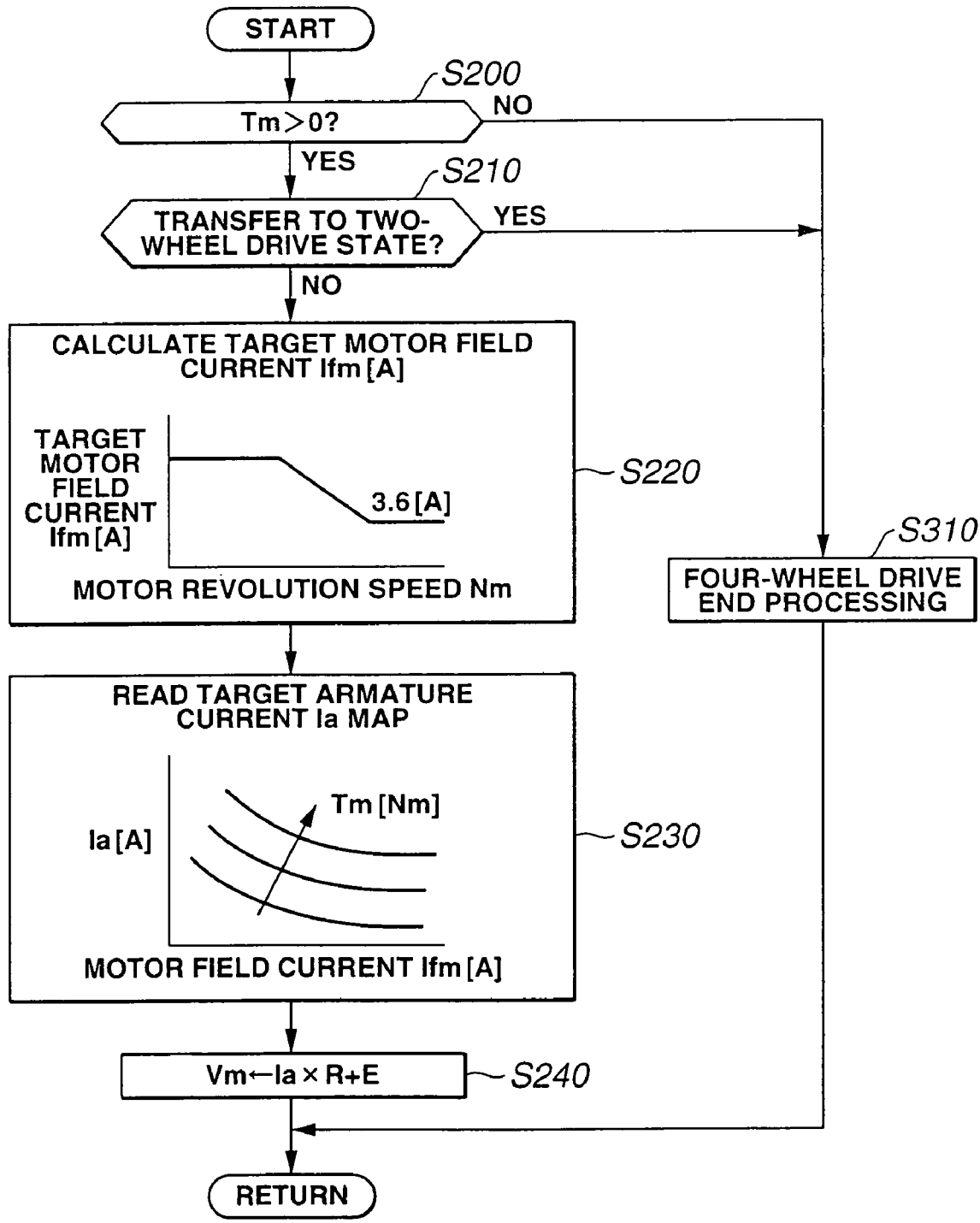
FIG. 6 is a processing flowchart executed in a motor variable adjusting section of the 4WD controller shown in FIGS. 1 and 2.

Next, the processing of a motor variable adjusting section 8B will be described with reference to FIG. 6. Motor variable adjusting section 8B is activated for each predetermined sampling period. At a step S200, motor variable adjusting section 8B determines whether target motor torque Tm is larger than zero. If Tm>0 (Yes) at step S200, the routine goes to a step S210 since front road wheels 1L, 1R are in the acceleration slip state (a motor drive request state) (namely, in the 4WD state). If Tm≦0 (No), the vehicle is not in the 4WD state (no motor drive request state) and the routine goes to a step S310. At step S310, various signals in the 2WD state such as a signal to stop a generation (Vm=0) are outputted and the routine is ended.

At step S210, motor variable adjusting section 8B determines whether a transfer from the four-wheel drive state to the two-wheel drive state occurs. If the transfer to the two-wheel drive state occurs (Yes) at step S210, the routine goes to step S310 at which a four-wheel drive end processing is carried out such as a generation stop (Vm=0) and the routine is returned. For example, when the motor revolution speed is determined to be approaching to an allowable limit revolution speed and a range of transmission 30 is in a non-drive range (parking or neutral), it is determined that the transfer to the two-wheel drive state occurs. On the other hand, in the case of the four wheel drive state, the routine goes to a step S220.

At step S220, motor variable adjusting section 8B inputs revolution speed Nm of motor 4 detected by motor revolution speed sensor 26 and calculates a target motor field current Ifm in accordance with revolution speed Nm of motor 4. Then, the routine goes to a step S230. It is noted that motor controlling section 8C performs a feedback control on the basis of a deviation of the field current value of motor 4 detected by the field current sensor from target motor field current Ifm.

It is noted that target motor field current Ifm of motor 4 with respect to revolution speed Nm of motor 4 is a constant predetermined current value in a case where revolution speed Nm is equal to or below a predetermined revolution speed. In a case where revolution speed of motor 4 is equal to or higher than the predetermined revolution speed, a well known field-weakening control method reduces field current Ifm of motor 4. That is to say, since revolution speed of motor 4 becomes high, the motor torque is reduced due to a rise in a motor induced voltage E. As described above, if revolution speed Nm of motor 4 is equal to or higher than the predetermined value, field current Ifm of motor 4 is reduced and induced voltage E of motor 4 is reduced so that a current flowing through motor 4 is increased to obtain a required motor torque. Consequently, even if revolution speed of motor 4 becomes high, the rise in the induced voltage E is suppressed and the reduction in the motor torque is suppressed. Hence, the required motor torque can be obtained. In addition, since motor field current Ifm is controlled at two stages of lower than a predetermined revolution speed and equal to or higher than the predetermined revolution speed, a control electronic circuit can be inexpensive as compared with a continuous field current control. It is noted that a motor torque correcting section may be installed which continuously corrects the motor torque by adjusting field current Ifm in accordance with revolution speed Nm of motor 4 for the required motor torque. That is to say, for the two-stage switching, field current Ifm of motor 4 may be adjusted according to revolution speed Nm of motor 4. As a result of this, even if revolution speed of motor 4 becomes high, a rise in the induced voltage E of motor 4 is suppressed and the reduction of motor torque is suppressed. Hence, the required motor torque can be obtained. In addition, since a smooth motor torque characteristic can be achieved, the vehicle can stably be traveled as compared with the two-stage control and a motor drive efficiency can be in a favorable state.

Next, at step S230, with target motor torque Tm and target motor field current Ifm as variables, a corresponding target armature current Ia is derived on the basis of, for example, a map and the routine goes to a step S240. At step S240, on the basis of target armature current Ia, a generator voltage Vm for the target motor torque (Vm=Ia×R+E, wherein E denotes an induced voltage of motor, R denotes a resistance between generator 7 and motor 4) is calculated and outputted. Then, the processing is ended. In addition, motor controlling section 8C performs a feedback control for motor field current with target field current Ifm determined at motor variable adjusting section 8B as a target value.

Furthermore, generator controlling section 8F includes a generated voltage determining section 8Fa and a generator controlling portion main body 8Fb. Generated voltage determining section 8Fa performs the select high between target generator voltage Vm determined at motor variable adjusting section 8B and a generated voltage Vb determined at battery controlling section 8C (step S450) as will be described later and sets a larger voltage to a target generator voltage Vt. Generator controlling section main body 8Fb derives a field current value for a target generator voltage Vt on the basis of target generator voltage Vt and the present output voltage Vg, derives generator control command value C1 (the duty ratio) corresponding to the field current value, and outputs it to voltage regulator 22 of generator 7, and controls output voltage Vg of generator 7.

Figure 7:
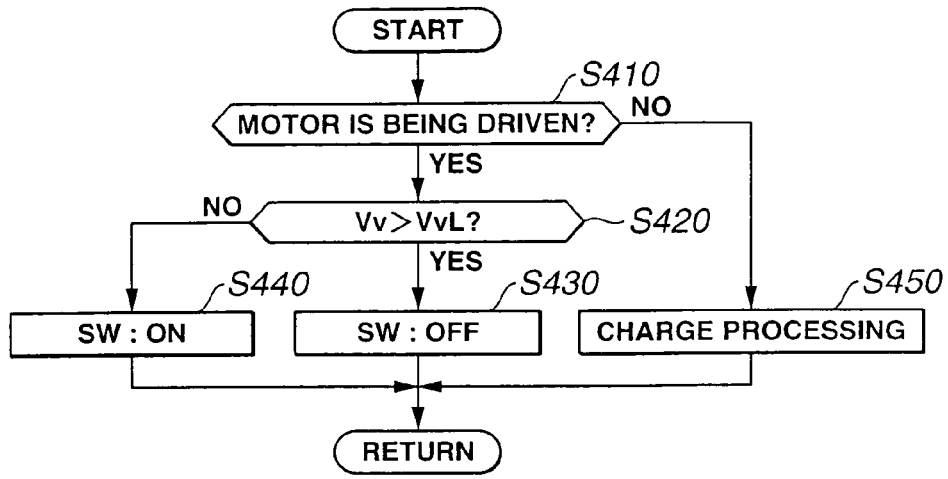
FIG. 7 is a processing flowchart of a battery controlling section of the 4WD controller.

Next, a processing of battery controlling section 8G which is a condenser controlling section will be described below. Battery controlling section 8G is activated for each predetermined sampling period and performs the processing as shown in FIG. 7. At a step S410, battery controlling section 8G determines whether motor 4 is being driven. If battery controlling section 8G determines that the motor is being driven, namely, the motor is in the four-wheel drive (4WD) state, the routine goes to a step S420. If not so (No), the routine goes to a step S450.

At step S420, battery controlling section 8G determines whether vehicle speed Vv is in excess of predetermined vehicle speed VvL. If vehicle speed Vv is determined to be in excess of predetermined vehicle speed VvL (Yes), the routine goes to a step S430 at which switch SW is turned off, battery 42 being interrupted (disconnected) or being held to be turned off (disconnected) from generator 7 and motor 4. On the other hand, in a case where the vehicle speed is equal to or below predetermined vehicle speed VvL (No), the routine goes to a step S440 in which switch SW is turned on, battery 42 being connected or being held to be connected to generator 7 and the routine is ended. Then, the processing is ended.

The above-described predetermined vehicle speed VvL is, for example, determined on the basis of one of the following procedures.

(First Determining Method)

Predetermined vehicle speed VvL is a value equal to a predetermined vehicle speed used when second target motor torque Tm2 is determined at the above-described accelerator sensitivity, for example, predetermined low vehicle speed VvvL estimated that the vehicle gets out of the vehicle start state.

(Second Determining Method)

Figure 9A:
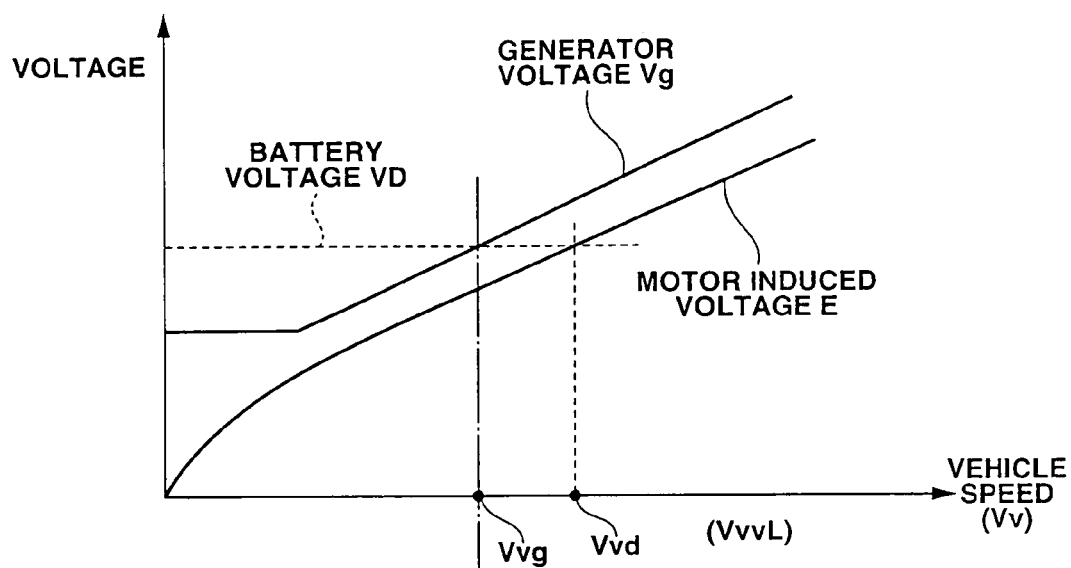
FIGS. 9A and 9B are characteristic graphs, each representing a predetermined vehicle speed used in the processing flowchart of FIG. 7.
Figure 9B:
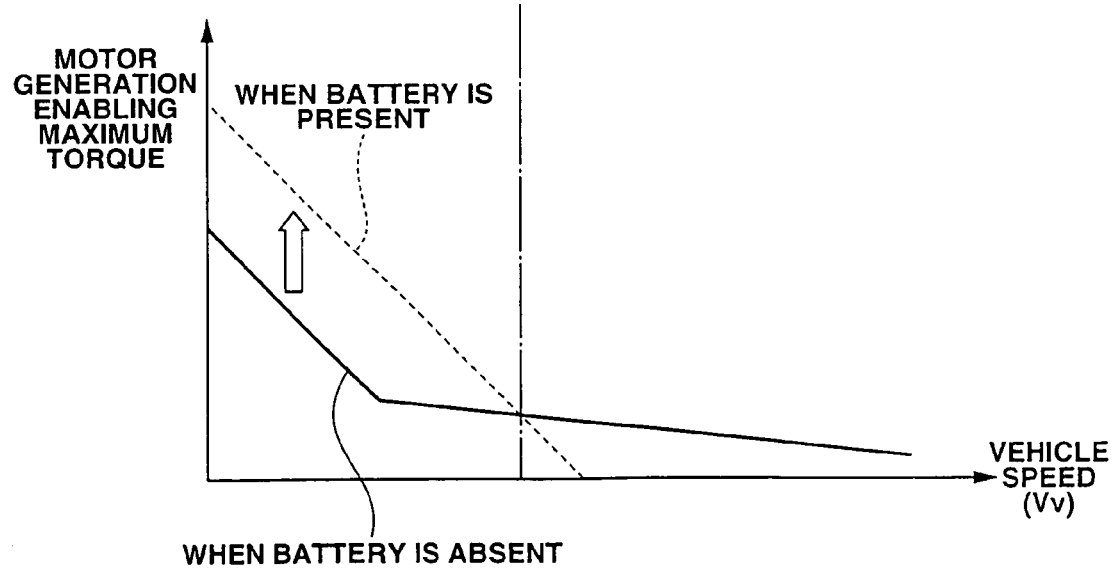

Vehicle speed Vvg estimated when output Vg of generator 7 corresponds to voltage VD of battery 42 is predetermined vehicle speed VvL (refer to FIGS. 9A and 9B).

(Third Determining Method)

Vehicle speed Vvd estimated when induced voltage E of motor 4 driven by means of generator 7 corresponds to a voltage of battery 42 is predetermined vehicle speed VvL (refer to FIGS. 9A and 9B).

On the other hand, at step S450, battery controlling section 8G determines that a remaining capacity of battery 42 is equal to or lower than a predetermined capacity on the basis of the signal from remaining capacity detecting section, switch SW is turned to ON and generator 7 is in a power generation state and performs a charging processing. Alternatively, with second switch (not shown) to perform the connection and interruption (disconnection) between battery 42 and motor 4 and generator 7 installed in electric wire, switch SW may be turned on and second switch may be turned to OFF, a motor regeneration may charge battery 42.

Figure 8:
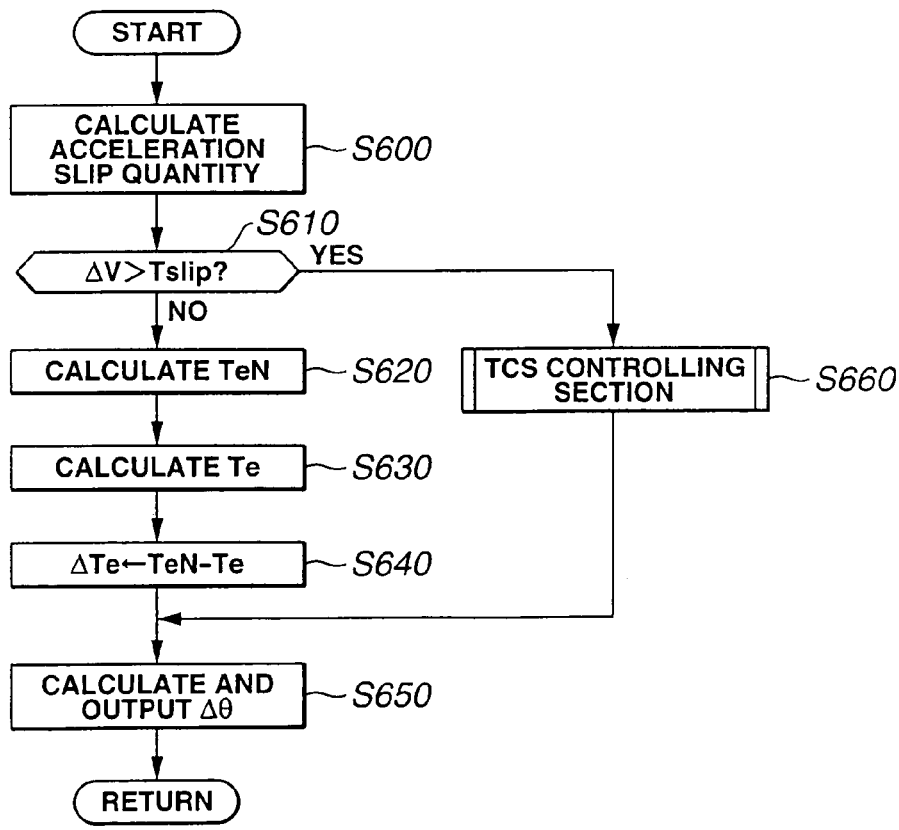
FIG. 8 is a processing flowchart representing a procedure of an engine controller shown in FIG. 1.

Next, a processing of engine controller 18 will be described below. Engine controller 18 carries out the processing as shown in FIG. 8 on the basis of inputted each signal for each of predetermined sampling periods. That is to say, at a step S600, engine controller 18 derives an acceleration slip quantity ΔV of front road wheels 1L, 1R which are the mainly driven wheels. Then, the routine goes to a step S610. At step S610, engine controller 18 determines whether acceleration slip quantity ΔV is in excess of a target slip quantity Tslip. If acceleration slip quantity ΔV is in excess of target slip quantity (Yes) at step S610, the routine goes to a step S660. If acceleration slip quantity ΔV is equal to or below target slip quantity Tslip (No), the routine goes to a step S620. It is noted that target slip quantity Tslip is set to about 10%, for example, in a slip rate.

At step S620, engine controller 18 calculates a target output torque TeN that the vehicle driver demands on the basis of the detection signal from accelerator sensor 40 and the routine goes to a step S630. At step S630, engine controller 18 calculates a present output torque Te on the basis of a throttle opening angle and engine (revolution) speed Ne and the routine goes to a step S640. At step S640, engine controller 18 outputs a deviation ΔTe of target output torque TeN with respect to the present output torque Te on the basis of the following equation and the routine goes to a step S650.

$$\Delta Te = TeN - Te$$

On the other hand, at step S660, engine controller 18 performs a, so-called, engine TCS (Traction Control System) control, substitutes a variation of a predetermined TCS torque into deviation ΔTe and the routine goes to a step S650. This step (S660) constitutes an internal combustion engine output suppressing section. In addition, at a step S650, engine controller 18 calculates a variation Δα of throttle opening angle α in accordance with deviation ΔTe, outputs the opening angle signal corresponding to variation Δα of its opening angle to stepping motor 19, and the routine is returned. It is noted that, in the above explanation, opening angle signal Δα corresponding to deviation ΔTe is outputted. In the actual practice, in order to smooth the variation such as the torque, the torque is varied by a predetermined torque increment or a predetermined torque decrement whenever an activation of this step occurs.

Next, an action in the above-described driving force control system will be described below. It is noted that drive mode switch 39 is supposed to be operated in the 4WD state. During the vehicular travel, if the torque transmitted to the front wheels 1L, 1R from engine 2 is larger than a road surface reaction force limit torque due to a small road surface frictional efficient to each tire or due to the large depression quantity on accelerator pedal 17, namely, when front road wheels 1L, 1R which are mainly driven wheels are in the acceleration slip state, clutch 12 is connected, generator 7 is generated at a generation load in accordance with acceleration slip quantity ΔV so that motor 4 is driven and the vehicle is transferred in the 4WD state. At this time, an extra power generated by generator 7 causes motor 4 to be driven so that rear road wheels 3L, 3R are driven which are auxiliary driven wheels. Thus, a vehicular acceleration ability is improved. In addition, since motor 4 is driven by means of an extra torque which exceeds a road surface reaction force limit torque of the mainly driven wheels 1L, 1R. Therefore, an energy efficiency is improved and fuel economy (a fuel consumption) is improved.

Next, since drive torque transmitted to front wheels 1L, 1R is adjusted to approach to the road surface reaction force limit torque of front road wheels 1L, 1R, the vehicle is transferred to the 2WD state. Consequently, the acceleration slip at front wheels 1L, 1R which are mainly driven wheels is suppressed. In addition, during the start of the vehicle, even if the acceleration slip at front road wheels 1L, 1R is zero or small state, motor 4 is driven by means of target motor torque Tm2 which accords with accelerator opening angle θ. Thus, the start acceleration characteristic is secured. Furthermore, in this embodiment, in a case where vehicle speed Vv is smaller than predetermined vehicle speed VvL, the current is supplied from an output from generator 7 and from battery 42 to the motor so that an augmentation of the motor torque can be achieved. Thus, in a low speed region in which the drive torque is demanded, the improvement in the drive torque of the whole vehicle can be achieved without carrying out a large sizing of generator 7.

It is noted that, in this embodiment, a manner of two settings with predetermined vehicle speed VvL will be illustrated. Next, an action and advantages for each setting will be described below.

(1) A case where predetermined vehicle speed VvL is set to predetermined low vehicle speed VvvL at which the vehicle is estimated that the vehicle gets out of the start state. In this case, a start acceleration ability can be improved.

(2) A case where predetermined vehicle speed VvL is set to vehicle speed Vvg at which it is estimated that a generation enabling voltage of generator 7 corresponds to a voltage of battery 42. As vehicle speed Vv is increased, the revolution of generator 7 is increased in proportion to vehicle speed Vv. Thus, output enable voltage of generator 7 is increased. Then, if the output voltage of generator 7 is in excess of battery voltage VD, a part of generated current generated by generator 7 is caused to flow into battery side 42. Thus, there is a possibility that the required motor voltage and current cannot be secured. In addition, if the generated voltage of generator 7 becomes equal to or larger than a predetermined value with respect to battery voltage, there is a possibility that battery 42 becomes excessively charged. However, in this embodiment, when the vehicle speed becomes the predetermined vehicle speed Vv at which there is a possibility that battery side current is caused to flow from generator 7, battery 42 is disconnected from generator 7 and motor. Thus, the above-described problem would be eliminated.

(3) A case where predetermined vehicle speed VvL is set to vehicle speed Vvd at which induced voltage E of motor driven by means of generator 7 is estimated to correspond to the voltage of battery 42. As vehicle speed Vv is increased, the revolution of rear road wheels, namely, the revolution of the motor is increased, induced voltage E of motor 4 is increased. Then, if induced voltage E of motor 4 is in excess of motor voltage, a current is not caused to flow from battery 42 to motor 4. Even if battery 42 is connected to the motor, the increases of the motor current and the motor voltage cannot be achieved by battery 42. In addition, motor induced voltage E becomes high so that there is a possibility that an excessive voltage is loaded on battery 42.

On the other hand, in this embodiment, when the vehicle speed becomes a vehicle speed Vvd at which motor induced voltage E is estimated to be in excess of battery voltage VD, battery 42 is disconnected from generator 7 and motor 4. Thus, the above-described problem is solved. It is noted that, in this embodiment, for example, the determination of predetermined vehicle speed VvL is the vehicle speed at which the start is finished, the vehicle speed at which the generation enabling voltage corresponds to the battery voltage, or the vehicle speed at which motor induced voltage E corresponds to a battery voltage. However, the present invention is not limited to this. Predetermined vehicle speed VvL may be determined from another condition.

In addition, in this embodiment, a disconnection condition between battery 42 and motor and generator 7 on the basis of vehicle speed Vv is determined. However, the present invention is not limited to this. For example, the disconnection condition may be when output voltage Vg of generator 7 is in excess of battery voltage VD. Or alternatively, the disconnection condition may be when actual motor induced voltage E is in excess of battery voltage VD. In addition, a voltage of the mounted battery 42 may be determined according to a region in which the driving force is increased. In addition, as the condenser, battery 42 is exemplified. However, the capacity may be the condenser. Furthermore, motor 4 may be alternating current motor in place of the direct current motor.

The entire contents of a Japanese Patent Application No. 2004-167914 (filed in Japan on Jun. 7, 2004) are herein incorporated by reference. The scope of the invention is defined with reference to the following claims.

What is claimed is:

1. A driving force control apparatus for an automotive vehicle, comprising:
   an internal combustion engine that drives mainly driven wheels of the vehicle;
   a generator that is driven by the internal combustion engine;
   a motor that is driven by a power of the generator and is capable of driving other wheels than the mainly driven wheels;
   a condenser electrically connected to the generator in parallel with the motor; and
   a condenser controlling section that connects the condenser to the motor in a case where a vehicle speed (Vv) is equal to or lower than a predetermined vehicle speed and disconnects the condenser from the motor and the generator in a case where the vehicle speed is in excess of the predetermined vehicle speed.

2. A driving force control apparatus for an automotive vehicle as claimed in claim 1, wherein the predetermined vehicle speed is a vehicle speed at which a voltage for the generator to be enabled to be generated is estimated to be equal to a voltage across the condenser.

3. A driving force control apparatus for an automotive vehicle as claimed in claim 1, wherein the predetermined vehicle speed is a vehicle speed at which an induced voltage of the motor is estimated to be equal to a voltage across the condenser.

4. A driving force control apparatus for an automotive vehicle as claimed in claim 1, wherein the condenser controlling section connects the condenser to the motor in a case where the motor is in a drive state and an output voltage of the generator is lower than a voltage across the condenser and disconnects the condenser from the motor and the generator in a case where the output voltage across the generator is equal to or higher than the voltage across the condenser.

5. A driving force control apparatus for an automotive vehicle as claimed in claim 1, wherein the condenser controlling section connects the condenser to the motor in a case where the motor is in a drive state and an induced voltage of the motor is lower than a voltage across the condenser and disconnects the condenser from the motor and generator in a case where the induced voltage of the motor is equal to or higher than the voltage across the condenser.

6. A driving force control apparatus for an automotive vehicle as claimed in claim 1, wherein the condenser is a battery and wherein the condenser controlling section is a battery controlling section comprising:
   a first determining section that determines whether the motor is being driven;
   a second determining section that determines whether a vehicle speed (Vv) is in excess of a predetermined vehicle speed (VvL) when the first determining section determines that the motor is being driven; a switch (SW) which is turned on to connect or to hold a connection state between the battery and both of the motor and the generator when the second determining section determines that the vehicle speed (Vv) is equal to or lower than the predetermined vehicle speed (VvL) and which is turned off to disconnect or to hold a disconnection state of the battery from the generator and the motor when the second determining section determines that the vehicle speed (Vv) is in excess of the predetermined vehicle speed (VvL).

7. A driving force control apparatus for an automotive vehicle as claimed in claim 6, wherein the battery controlling section further comprises a remaining capacity detecting section that detects a remaining capacity of the battery and wherein the battery controlling section turns the switch (SW) on to charge the battery from the generator in a power generation state when the remaining capacity of the battery is equal to or lower than a predetermined capacity when the first determining section determines that the motor is not being driven.

8. A driving force control apparatus for an automotive vehicle as claimed in claim 6, wherein the predetermined vehicle speed is a predetermined low vehicle speed (VvL) estimated that the vehicle gets out of a start state.

9. A driving force control apparatus for an automotive vehicle as claimed in claim 6, wherein the predetermined vehicle speed (VvL) is a vehicle speed (Vvg) at which an output voltage (Vg) of the generator is estimated to correspond to a voltage (VD) of the battery.

10. A driving force control apparatus for an automotive vehicle as claimed in claim 6, wherein the predetermined vehicle speed (VvL) is a vehicle speed (Vvd) at which an induced voltage (E) of the motor driven by the generator is estimated to correspond to a voltage (VD) of the battery.

11. A driving force control apparatus for an automotive vehicle as claimed in claim 6, wherein the front left and right road wheels are the mainly driven wheels and wherein, when the front left and right road wheels are in an acceleration slip state by an accelerator slip quantity ($\Delta V$), the generator generates at a generation load in accordance with the accelerator slip quantity ($\Delta V$) for the engine so that a vehicle drive state is transferred to a four-wheel drive state, and rear left and right road wheels are driven by the motor which is driven by an extra power of the generator.

12. A driving force control apparatus for an automotive vehicle as claimed in claim 11, wherein the motor is driven by an extra torque exceeding a road surface reaction force limit torque of the front left and right road wheels.

13. A driving force control apparatus for an automotive vehicle as claimed in claim 12, wherein a drive torque transmitted to the front left and right road wheels is adjusted to approach to the road surface reaction force limit torque so that a vehicular drive state is transferred to a two-wheel drive state.

14. A driving force control apparatus for an automotive vehicle as claimed in claim 13, wherein the vehicle is started with the motor driven in accordance with an accelerator opening angle ($\theta$).

15. A driving force control apparatus for an automotive vehicle as claimed in claim 14, wherein, when the vehicle speed (Vv) is equal to or lower than the predetermined vehicle speed (VvL), a current is supplied from an output of the generator and from the battery to the motor.

16. A driving force control method for an automotive vehicle, comprising:
   providing an internal combustion engine that drives mainly driven wheels of the vehicle;
   providing a generator that is driven by the internal combustion engine;
   providing a motor that is driven by a power of the generator and is capable of driving other wheels than the mainly driven wheels;
   providing a condenser electrically connected to the generator in parallel with the motor;

connecting the condenser to the motor in a case where a vehicle speed (Vv) is equal to or lower than a predetermined vehicle speed; and disconnecting the condenser from the motor and the generator in a case where the vehicle speed is in excess of the predetermined vehicle speed.

17. A driving force control apparatus for an automotive vehicle, comprising:

internal combustion engine means for driving mainly driven wheels of the vehicle;

generator means that is driven by the internal combustion engine means;

motor means which is driven by a power of the generator and is capable of driving other wheels than the mainly driven wheels;

condenser means which is electrically connected to the generator means in parallel with the motor means; and condenser controlling means for connecting the condenser means to the motor means in a case where a vehicle speed (Vv) is equal to or lower than a predetermined vehicle speed and disconnecting the condenser means from the motor means and the generator means in a case where the vehicle speed is in excess of the predetermined vehicle speed.

* * * * *